3,671,268
ICE-CREAM PRODUCTS
Anthony Blake, Ravensden, Bedford, and Denis Malcolm Halliday, Lavendon, and Michael Faulkner Woods, Stevington, England, assignors to Lever Brothers Company, New York, N.Y.
Filed Oct. 30, 1969, Ser. No. 872,612
Claims priority, application Great Britain, Nov. 1, 1968, 51,957/68; Mar. 26, 1969, 15,881/69
Int. Cl. A23g 5/00; A23l 1/06
U.S. Cl. 99—136
7 Claims

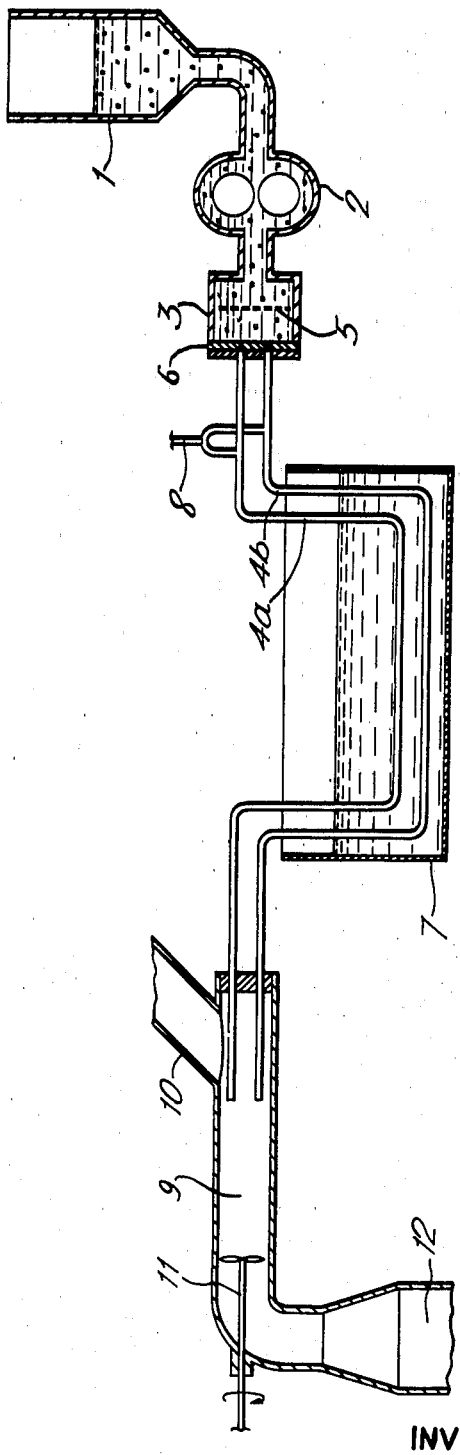

ABSTRACT OF THE DISCLOSURE

A variegated ice-cream product is produced by incorporating discrete pieces of a gelled fruit puree into ice-cream, water ice, mousse or sorbet. The gelled fruit puree may be set by cooling in a tube and extruded directly into the ice-cream mix, or may be set in bulk and pumped into the ice-cream mix by a pump which shreds the gel.

---

This invention relates to ice cream products containing fruit. The term "ice cream products" includes not only conventional ice cream but also mousse, sorbet and water ices.

There are disadvantages in the direct incorporation of chopped, untreated fruit into ice cream products. For example, when strawberries are incorporated into ice cream the agitation required to mix the fruit may break up the strawberry pieces to a pulp, so that no distinguishable pieces of fruit are found in the ice cream. Moreover, if they are carefully incorporated, for instance by hand, the fruit pieces remain frozen at the normal temperatures of serving ice cream, making the product difficult to slice and unpleasant to eat.

The invention provides an ice cream product having distributed throughout its bulk discrete pieces of a gelled fruit puree.

According to a preferred form of the invention the gelled fruit puree is formed from fruit puree, a gelling agent and a sugar. The gel formed is resistant to disintegration during mixing and the sugar present reduces the freezing point of the gel so that the gel is soft at the temperature at which ice cream itself is served, which is approximately from —20° C. to 0° C. The gel is consequently sliceable at these temperatures, which are those used in industry for cutting soft ice cream and by the consumer for slicing the product. Gels formed in this way have a texture at these low temperatures which is very similar to the texture of fruit, such as strawberries, peaches and pears, at room temperature. When the gel is made from strawberries using the most preferred process and the fruit pieces are distributed throughout the ice cream the texture of the fruit pieces in the ice cream is almost indistinguishable from that of strawberries at room temperature.

Gelling agents which can be used to form the gel include agar, carageenans, guar gum, locust bean gum and other vegetable gums, sodium alginate, gelatin and pectin, and mixtures of two or more of these. Generally the preferred gelling agent is a mixture of guar gum and locust bean gum. The gelling agent is generally used in amounts of 0.5–2% by weight, preferably 1–1.15%.

The amount of sugar used in forming the gel is generally 10–40% preferably 20–30%. It has been found that sucrose, the preferred sugar, used in amounts of 20–30% by weight gives the desired sweetness to the product. As well as sweetening the product the sugar in combination with the gelling agent lowers the freezing point of the pieces of fruit gel. For example, if the concentration of sugar is about 30%, the strawberry pieces are prevented from being hard-frozen even at temperatures of —20° C. If it is desired to produce a gel which has a particularly low freezing point, more sugar may be added to the gel mixture than is needed to sweeten it. In this case relatively non-sweetening sugars are preferably added to the mixture, for example high dextrose equivalent corn syrup.

Other materials can be added to the mixture from which the gel is formed. Thickeners or starches can be used, for example when cornflour is added the strength of the gel is improved before freezing and during handling. Flavouring materials can be added to the mixture from which the gel is formed. For example, the addition of about 0.5% of citric acid gives a considerable improvement in flavour to strawberry pieces. Synthetic strawberry flavour can also be added.

Variou fruits may be used in forming the fruit pieces of the present invention, for example strawberry, peach, pear, apple, grape, orange, grapefruit, and blackberry. It will be appreciated that the texture of the gelled pieces cannot resemble that of the natural fruit in all cases. Combinations of fruit, for example apple and blackberry or apple and strawberry may be used. In forming simulated strawberry pieces, some or all of the strawberry puree can be replaced by apple puree without losing the strawberry-like texture of the gelled pieces.

The gellable mixture can be prepared by mixing the ingredients and heating to at least 75° C. to dissolve the gelling agent. In a preferred procedure the sugar, the gelling agent and the citric acid, if used, and any other solid flavouring agent used are thoroughly mixed. The resulting mix is then dispersed throughout the fruit puree. The initial mixing of the dry ingredients is desirable, since if this is not complete, clumping may take place when the wet ingredients are added. The mixture is then heated to about 80° C. in a scraped surface heat exchanger. This is a rapid form of heating which is usually preferable if volatile flavouring compounds are used. The heating dissolves the gelling agents and also pasteurises the gellable mixture. We have found that the gel mixture both in the liquid and in the gel form contains many tiny air bubbles, the air being introduced in the mixing and pasteurising stages. The bubbles are a desirable feature of the product and contribute to the eating texture of the gelled pieces.

A preferred method used to incorporate pieces of fruit gel into the ice cream comprises pumping the heated gellable mixture formed as described above into a form of heat exchanger, which cools and sets up the gel. The gel may then be injected directly into a flow of ice cream where a cutter both chops the extruded rods of gel and disperses the gel into the final product.

The gel may alternatively be pumped continuously from the heat exchanger into a stream of ice cream from one or more freezers. The action of the pump used should be sufficient to tear the gel so that shreds of gel pass into the ice cream. The shreds of gel may then be dispersed throughout the ice cream using a rotating mixer.

Alternatively the gel may be passed from the heat exchanger into a storage container. This container is preferably sealed, to avoid bacterial contamination. The gel may then be broken into pieces and incorporated into an ice cream stream by pumping as described above.

The preferred heat exchanger comprises one or more cooled pipes, e.g. of 6 mm. diameter. The pipes may be cooled by surrounding them with a water bath containing flowing water at about 20° C. We have found that gelation occurs between 56 and 36° C., that is gelation starts at 56° C. and at 36° C. the gel is firm enough to be cut with a knife. The gel may be extruded into the hopper at a temperature between 0 and 35° C., preferably between 5 and 25° C. The temperature of the pipes used to cool the gel may be varied down to 0° C.

The gel should preferably be agitated as little as possible during its formation. Therefore the pipes in which the gel is set should be of as uniform a cross-section as possible, and it is important to stop any gelling taking place before the gellable mixture gets into this tube of uniform cross-section. However, it can pass round smooth bends down to about 1 in. diameter. It has also been found that the optimum strength of gel, in a 6 mm. diameter pipe, is achieved at a flow rate of about 200 grams per minute. If a higher flow rate is used, say 800 grams per minute, the gel formed is not set as satisfactorily despite the fact that turbulent flow does not occur at the higher flow rate.

The gellable mixture can be pumped to the cooling tubes, for example by gear pump, direct from the votator or a preheated stock of gellable mixture may be used. However, to obtain optimum gel strength, the gellable mixture should preferably not be held for more than 45 minutes in the liquid state. Pumping preferably takes place at 60° C. or over to avoid premature setting of the gel. It is desirable to have a filter and an orifice plate between the pump and the cooling tubes. The orifice plate, which generally has a small orifice situated opposite the entry to each of the cooling tubes creates high back pressure which will stay substantially constant, thus making possible a constant flow of gellable material through each pipe.

A preferred form of apparatus for carrying out the process in which a worm of gel is piped directly into an ice cream stream is shown in the accompanying drawing. A reservoir 1 is connected to a gear pump 2, which is connected through a chamber 3 to cooling tubes 4a, 4b, etc. In the chamber 3 is situated a filter 5 and a plate 6 having a number of small orifices in it. The cooling tubes 4a, 4b, are U-shaped, although any alternative shape may be used, and pass through a cooling bath 7 in which cold water is circulating. An injector 8 is situated on each cooling tube. The tubes open into a mixing chamber 9, into which a pipe 10 from a freezer (not shown) also opens. A rotary cutter 11 is situated inside the mixing chamber between the pipe 10 and a product outlet 12.

The gear pump pumps the gellable mixture from the reservoir 1 to the cooling tubes. The filter 5 removes any solid material from the gellable mixture, such as pips which may be present when strawberries are used. The orifice plate 6 controls the rate of flow of the gellable mixture and creates a high back pressure in the chamber 5. This substantially steady back pressure facilitates a steady flow of the gellable mixture into each cooling tube.

The injector 8 may be used to inject volatile flavouring elements into the flow of gellable mixture before it gels. After the mixture has cooled and gelled, it is extruded into the mixing chamber 9 where it meets a flow of soft ice cream from one or more freezers. The ice cream, together with the rods of extruded gelled puree, pass to the rotary cutter 11, which both cuts the rods of gelled material into pieces of the size desired, e.g. pieces of about ⅛ in. and also disperses the fruit gel pieces throughout the bulk of the ice cream. The ice cream having pieces of simulated fruit dispersed throughout it then passes through the product outlet 12 to be packed.

As stated previously, an alternative method for incorporating gelled pieces into ice cream comprises pumping the gel into the ice cream either directly from the heat exchanger or from a storage container. The preferred type of pump is a peristaltic type of pump, e.g. a mono pump which we have found tears the gel just sufficiently to provide shreds of gel of the preferred dimensions, which are about 2 to 5 mm. (average dimension.) If the gel is extruded from the cooling tubes into a container, this is suitably a sealed hopper. This may be situated so that the gel may be pumped directly into the ice cream stream in an in-line process, or may be made mobile.

In an alternative procedure, the gel may be set by cooling in trays instead of the pipes described above, and can then be transferred to a container when completely set, and subsequently incorporated into the ice cream as described above. In this process, care must be taken to avoid bacterial spoilage whilst the gel is being set. The gel can be set by means of a blast freezer or by keeping it in a chill store.

To assist in the subdividing of the gel by pumping, there may be frequent changes in the cross-section in the passage between the hopper and the pump and between the pump and the point where the gel meets the stream of ice cream. Generally the pumping action, together with these changes in cross-section, will tear the gel sufficiently to provide pieces of gel of the preferred dimensions. However, the rotating mixer may have cutting blads to subdivide the gel further.

The following examples illustrate the invention.

EXAMPLE 1

A gel was prepared from the following constituents:

| | Percent |
|---|---|
| Strawberry puree | 67.4 |
| Sucrose | 21.7 |
| Corn syrup | 8.3 |
| Corn flour | 1.1 |
| Locust bean gum | 0.8 |
| Citric acid | 0.5 |
| Agar | 0.2 |

The corn syrup was mixed with the strawberry puree at room temperature. The dry ingredients were mixed separately to thoroughly disperse the corn flour and gelling agent in the sugar. The two mixes were combined and were thoroughly mixed to obtain an homogenous mixture which was then heated to about 80° C. in a votator. The hot fruit mix was then pumped into a set of cooling pipes, first passing through an orifice as shown in the figure. The mixture gelled as it passed through the cooling bath and was extruded into a stream of ice cream, cut into pieces and distributed throughout the ice cream by the rotating cutter, as shown in the figure. The rate of extrusion of the fruit gel into the ice cream was such that the final product contained about 10% by weight of the fruit gel in the form of irregular lumps having the average diameter of about ⅛ in. The product could be sliced as easily as can a normal block of ice cream and when it was eaten, the pieces of fruit gel had a fruit-like texture—soft but fairly firm and very similar to that of strawberries at room temperature.

EXAMPLE 2

A gel was prepared from:

| | Percent |
|---|---|
| Strawberry puree | 68.26 |
| Sucrose | 26.7 |
| Water | 3.3 |
| Gelling agent (a commercial mixture containing guar gum and locust bean gum in approximately equal proportions with a little carageenan) | 1.0 |
| Citric acid | 0.5 |
| Artificial flavouring agent | 0.24 |

The dry ingredients (sucrose, gelling agent and citric acid) were thoroughly mixed. These were then dispersed in the wet ingredients and were heated to about 80° C. in a votator. The mixture was then gelled and incorporated into ice cream as described in Example 1.

EXAMPLE 3

A gellable mixture was prepared from:

| | Percent |
|---|---|
| Strawberry puree | 67.4 |
| Sucrose | 21.7 |

EXAMPLE 3—Continued

|  | Percent |
|---|---|
| Corn syrup | 8.3 |
| Corn flour | 1.1 |
| Agar | 1.0 |
| Citric acid | 0.5 | by the method used in Example 1. The mixture was then gelled and injected into ice cream in an apparatus of the type shown in the drawing. The product obtained was similar to that obtained from Example 1 or 2, but it could be seen that some of the fruit gel had broken up. The texture of the artificial fruit pieces which remained intact was similar to that of strawberry fruit, but was shorter than that of the gelled pieces of Example 1.

EXAMPLE 4

A gellable mixture was formed from:

|  | Percent |
|---|---|
| Strawberry puree | 67.4 |
| Sucrose | 21.6 |
| Corn syrup | 8.3 |
| Corn flour | 1.1 |
| Carageenan | 1.0 |
| Citric acid | 0.5 |
| Potassium chloride | 0.1 | by the method of Example 1. When this was gelled and incorporated into ice cream the artificial fruit pieces obtained had a very firm texture and there appeared to be no undesired breaking of the gel. The fruit gel pieces had a texture similar to fruit, but pastier than that of the pieces of Examples 1 and 2.

EXAMPLE 5

A gel was formed from:

|  | Percent |
|---|---|
| Strawberry puree | 67.4 |
| Sucrose | 20.7 |
| Corn syrup | 8.3 |
| Gelatin | 2.0 |
| Corn flour | 1.1 |
| Citric acid | 0.5 | by the method of Example 1 and was incorporated into ice cream. The artificial fruit pieces in the ice cream were discrete and were well set but had a more elastic texture than the fruit pieces of Examples 1 and 2.

EXAMPLE 6

This example illustrates the use of fruit other than strawberries. A variety of these gels were prepared; in each case the formulation was:

|  | Percent |
|---|---|
| Fruit puree | 67.4 |
| Sucrose | 21.7 |
| Corn syrup | 8.3 |
| Corn flour | 1.1 |
| Gelling agent (that used in Example 2) | 1.0 |
| Citric acid | 0.5 |

The fruits tested were peach, pear, apple, grape, orange, grapefruit and a combination of apple and blackberry. In each case a firm gel was produced and the ice cream product was sliceable at normal ice cream temperatures and the artificial fruit pieces had a fruit-like texture when eaten. In the case of peach, pear and apple the texture of the fruit gel pieces when eaten in ice cream was very similar to the texture of the normal fruit when eaten at room temperatures. In the case of grape, orange and grapefruit the fruit gel pieces were recognisable as discrete pieces having a distinctive flavour, but the texture of the original fruit was not reproduced.

The combination of apple and blackberry appeared as fruit gel pieces having a texture, when eaten at ice cream temperature, very similar to that of the apple at normal temperatures.

EXAMPLE 7

Sucrose (3.00 kg.), citric acid (54 g.) and a gelling agent which was a mixture of guar gum and locust bean gum with a little carrageenan (109 g.) were thoroughly mixed in a Hobart mixer. When this mixing was complete strawberry puree (7.42 kg.) containing 358 g. of added water and 13 g. of flavouring agents was added to the dry ingredients and mixed to a smooth homogenous suspension. This suspension was rapidly heated to 80° C. in a scraped surface heat exchanger. The hot suspension was then transferred to the reservoir of an apparatus similar to that shown in the drawing. This gellable suspension was then pumped through a plate having orifices of 0.8 mm. into 6 mm. diameter pipes. Care was taken that the gel was kept at a temperature above 60° C. while passing through the pump. The ¼ in. diameter pipes were cooled by cold water over part of their length and gelling of the suspension took place within them. The rods of gel thus formed passed into a sealed hopper.

When the rods of gel has been collected in the hopper, this was connected to a mono pump. This pumped the gel through a ¼ in. diameter pipe into the flow of ice cream from a freezer. It was observed that the gel was torn by its progress through the pump and the gel emerged into the ice cream flow in the form of shreds of approximately 3 mm. average dimensions. The flow of ice cream carried the pieces of gelled fruit puree passed a rotating mixer which dispersed them throughout the ice cream. The flow of ice cream and the flow of gelled fruit puree were adjusted so that the icre cream contained 10% by weight of the pieces of gelled fruit puree. The ice cream having simulated fruit pieces dispersed throughout it was then cut and packed.

EXAMPLE 8

A gellable mixture of strawberry puree, granulated sugar, gelling agent, citric acid and flavours was prepared as described in Example 7 and was heated to 80° C. in a scraped surface heat exchanger. This hot mixture was then placed in a blast freezer and was set in blocks until the temperature at the centre of each block had fallen below 25° C. These blocks were then sliced and were loaded into a pumping apparatus of the type used for stuffing sausages. This was used to pump the gel into a stream of ice cream from a freezer. The gel was pumped through a tube and emerged into the ice cream stream through a 6 mm. nozzle. 10% by weight of the gel was incorporated into the ice cream and this appeared in the ice cream as torn pieces. These were dispersed through the ice cream by a rotating mixer and the ice cream containing simulated fruit pieces was cut and packed.

What is claimed is:

1. A method of making an ice cream product containing discrete pieces of a gelled fruit puree comprising the steps of:
    (i) mixing together a fruit puree, a gelling agent selected from the group consisting of agar, carageenans, guar gum, locust bean gum and mixtures thereof and a sugar to form a gelable mixture,
    (ii) heating the mixture to at least 75° C.,
    (iii) passing the resulting mixture while still fluid into setting pipes,
    (iv) setting the gelable mixture by cooling while it is still in the pipes,
    (v) extruding the gelled fruit puree in the form of rods directly into an ice cream mix.

2. A method according to claim 1, in which a rotating cutter chops the rod of gelled material after it has entered the ice cream mix and disperses it throughout the ice cream.

3. A method according to claim 1 in which the gelling agent comprises 0.5 to 2% by weight of the gelable mixture.

4. A method according to claim 1 in which the sugar comprises 10 to 40% by weight of the gelable mixture.

5. A method according to claim 1 in which the gelling agent comprises a mixture of guar gum and locust bean gum.

6. A method of making an ice cream product containing discrete pieces of a gelled fruit puree comprising the steps of:
   (i) mixing together a fruit puree, a gelling agent selected from the group consisting of agar, carageenans, guar gum, locust bean gum and mixtures thereof and a sugar to form a gelable mixture,
   (ii) heating the mixture to at least 75° C.,
   (iii) passing the resulting mixture while still fluid into setting pipes,
   (iv) setting the gelable mixture by cooling while it is still in the pipes,
   (v) extruding the gelled fruit puree from the pipes in the form of rods,
   (vi) sub-dividing the rods of gelled fruit puree into discrete pieces,
   (vii) incorporating the discrete pieces of gelled fruit puree into an ice cream product.

7. A method of making an ice cream product according to claim 6 wherein said incorporation of said discrete pieces of gelled fruit puree into said ice cream product is by pumping.

References Cited
UNITED STATES PATENTS

| | | | |
|---|---|---|---|
| 2,550,656 | 4/1951 | Knechtges | 99—136 X |
| 3,112,202 | 11/1963 | Wadsworth | 99—136 X |
| 2,651,575 | 9/1953 | Talburt et al. | 99—136 |
| 2,576,842 | 11/1951 | Lehner | 99—136 |
| 3,111,411 | 11/1963 | Livingston | 99—136 X |
| 2,868,142 | 1/1959 | Beyette | 99—136 X |
| 2,032,970 | 3/1936 | Bendfelt | 99—136 |

RAYMOND N. JONES, Primary Examiner

J. M. HUNTER, Assistant Examiner

U.S. Cl. X.R.

99—129